United States Patent [19]

Miller et al.

[11] Patent Number: 4,857,922

[45] Date of Patent: * Aug. 15, 1989

[54] WINDSHEAR DETECTION AND WARNING SYSTEM WITH EVASION COMMAND

[75] Inventors: Harry Miller, Scottsdale; Terry Zweifel, Phoenix, both of Ariz.

[73] Assignee: Honeywell Inc., Minneapolis, Minn.

[*] Notice: The portion of the term of this patent subsequent to Jun. 3, 2003 has been disclaimed.

[21] Appl. No.: 834,374

[22] Filed: Feb. 28, 1986

Related U.S. Application Data

[63] Continuation-in-part of Ser. No. 492,085, May 6, 1983, Pat. No. 4,593,285.

[51] Int. Cl.$^4$ .............................................. G08B 23/00
[52] U.S. Cl. .................................. 340/968; 73/178 T; 244/191; 340/963; 340/967; 364/427; 364/428; 364/434
[58] Field of Search ................ 340/963, 973, 966-971; 364/427, 428, 433, 434, 565; 244/181, 182, 191, 76 C; 73/178 T

[56] References Cited

U.S. PATENT DOCUMENTS

| | | | |
|---|---|---|---|
| 3,761,691 | 9/1973 | Schultz et al. | 364/428 |
| 3,814,912 | 6/1974 | Manke et al. | 340/967 |
| 3,948,096 | 4/1976 | Miller | 73/178 R |
| 4,043,194 | 8/1977 | Tanner | 340/968 |
| 4,079,905 | 3/1978 | Greene | 340/968 |
| 4,127,249 | 11/1978 | Lambregts | 244/191 |
| 4,229,725 | 10/1980 | Reilly | 340/968 |
| 4,250,746 | 2/1981 | Vassie et al. | 73/178 T |
| 4,433,323 | 2/1984 | Grove | 340/963 |
| 4,586,140 | 4/1986 | Millen | 340/968 |
| 4,593,285 | 6/1986 | Miller et al. | 340/968 |

FOREIGN PATENT DOCUMENTS 1567554  5/1980  United Kingdom ................ 340/970

Primary Examiner—Joseph A. Orsino
Assistant Examiner—Brent A. Swarthout
Attorney, Agent, or Firm—Arnold L. Albin

[57] ABSTRACT

An improved windshear warning apparatus for aircraft, responsive to both the magnitude of the wind shear and the allowable time the windshear can be tolerated at a given magnitude. The sensed magnitude is used to compute the allowable time before providing a windshear alarm. For large windshear rates, the allowable time is short; conversely for small windshear rates which exceed a threshold level, a longer time period is computed before an alarm occurs. Since a windshear rate must persist for the computed allowable time before activating the alarm, windshear rates that are above the threshold level for elapsed time less than the computed allowable time will not result in an enunciation, while high magnitude windshear rates of short duration will not cause false alarms since they do not exceed the computed allowable time.

14 Claims, 10 Drawing Sheets

WIND SHEAR DETECTION SYSTEM

DIAGRAM SHOWING CHANGES IN MAGNITUDE AND DIRECTION OF AIRCRAFT ACCELERATION VECTOR WHEN SUBJECTED TO A WIND DOWN BURST

ACCELERATION VECTOR
IN VERTICAL PLANE

ANGLE OF ATTACK DISPLAY FOR
WIND SHEAR DETECTION SYSTEM

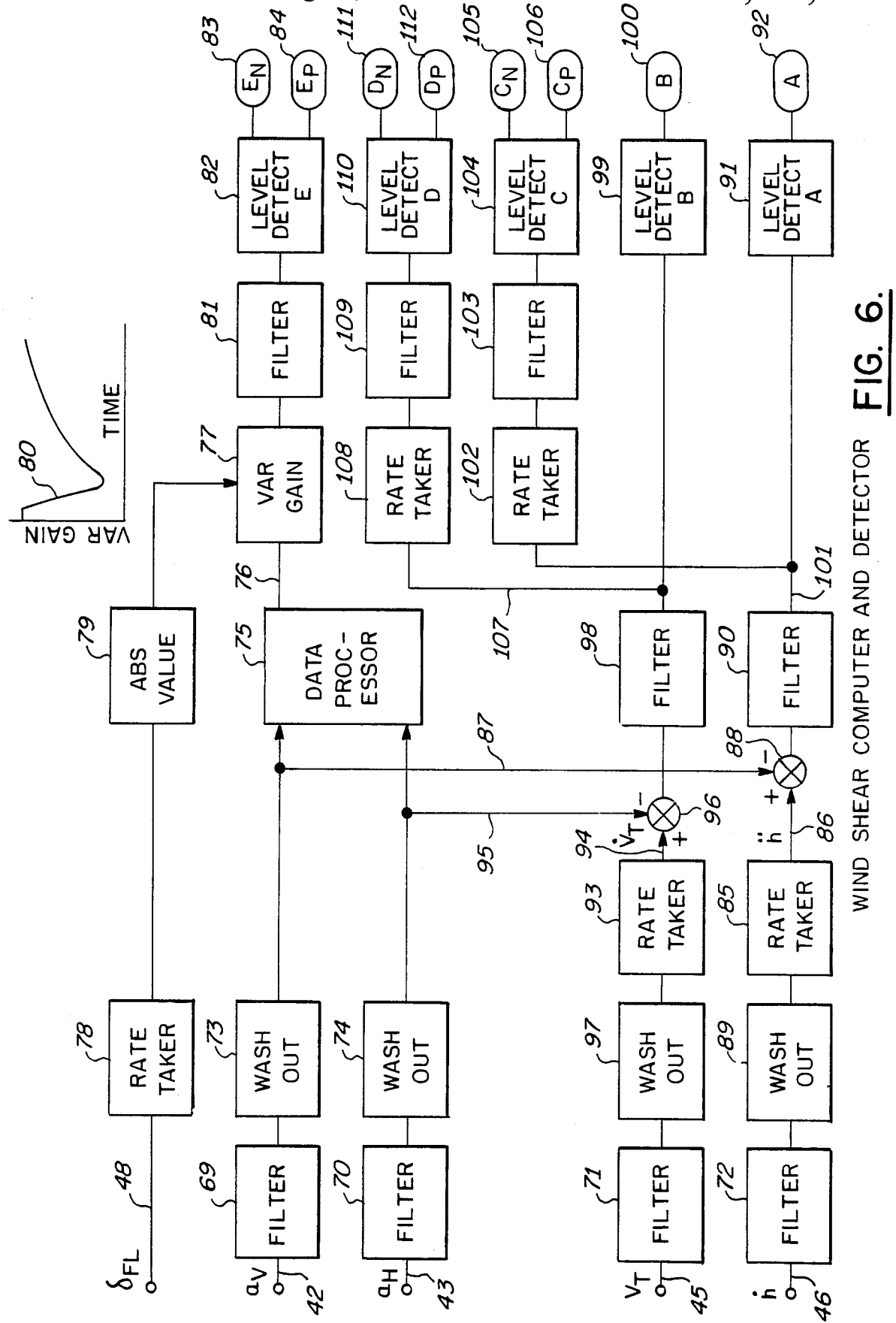
FIG. 6. WIND SHEAR COMPUTER AND DETECTOR

WINDSHEAR DETECTION AND WARNING SYSTEM WITH EVASION COMMAND

This application is a continuation-in-part of co-pending application Ser. No. 492,085, filed May 6, 1983, now U.S. Pat. No. 4,593,285.

BACKGROUND OF THE INVENTION

1. Field of the Invention

The present invention relates generally to aircraft flight performance computer systems and more particularly to a system for detecting and/or providing a warning of impending dangerous windshear conditions and for providing an avoidance command through the pitch director and throttle systems to enable the flight crew to avoid such conditions in a timely and safe manner.

2. Description of the Prior Art

Windshear is a weather condition which results in rapidly changing wind velocity and direction and in terms of aircraft flight performance is, of course, most dangerous during takeoffs and landing approaches. A number of attempts and proposals have been made to provide the flight crew of an aircraft with a warning of impending windshear conditions. One method that is presently in use is based on ground observations of wind conditions at sporadic locations around an airport. These wind determinations have been shown to be inadequate during several occurrences which have resulted in serious accidents. Other methods utilize on-board apparatus for detecting ground speed and comparing the ground speed to a measure of the airspeed of the aircraft and may include some sensing of vertical inertial acceleration. U.S. Pat. Nos. 4,012,713 and 4,079,905 are typical of such systems. A prior system previously described by one of the present inventors is based on the energy residing in the aircraft at any instant as it proceeds along a flight path, as in U.S. patent application Ser. No. 239,289, filed Mar. 2, 1981, now abandoned. A deficiency of the prior on-board systems is that while they may be effective in determining horizontal wind variations, they are inadequate for adequately determining vertical wind variations such as downdrafts and updrafts. Analyses of accidents that have been caused by severe wind variations near the ground indicate that they are composed of rapidly changing combinations of both wind components. These result in rapid changes in the magnitude and direction of the total acceleration vector which determines the aircraft's flight path in the vertical plane.

A further deficiency of prior art systems that utilize indicated airspeed (IAS) or calibrated airspeed (CAS) is that they do not take into account changes in the density of the air mass at varying temperature and altitude, thereby resulting in errors in the apparent windrate.

A typical windshear situation is graphically illustrated in FIG. 1. An aircraft approaching a runway 3 attempts to fly along a glide slope 4, defined as the straight line between $P_1$ and $P_2$. If a wind downburst exists along the glide slope, as illustrated in FIG. 1, the initial effect on the aircraft occurs at a point $O_1$ on the glide slope, where it encounters an increasing headwind. This causes an increase in lift and a deceleration relative to the ground. The total acceleration vector, designated $A_{VH}$, is the resultant of the inertial vertical acceleration component $a_V$ and the inertial horizontal acceleration component, $a_H$. At point $O_1$, the vector $A_{VH}$ points upward and backward with respect to the aircraft's path relative to the ground. Thus, there is a significant change in the magnitude of the resultant acceleration vector as the aircraft travels between $P_1$, where there is no appreciable acceleration vector, and $O_1$, where there now exists a sizeable acceleration vector.

The increase in lift at point $O_1$ causes the flight path, 5 of the aircraft to go above the glide slope 4. There is also an increase in airspeed at $O_1$ due to the inertia of the aircraft carrying it into the headwind and in spite of the fact that the aircraft is being decelerated relative to the ground. The pilot's normal reaction under these conditions is to reduce thrust and pitch the aircraft down to reduce airspeed and to realign the aircraft to its intended glide path 4.

As the aircraft passes the center of the windburst column, the headwind changes to a tailwind. The tailwind causes a decrease in airspeed, again due to the inertia of the aircraft carrying it into the tailwind and resulting in a forward acceleration relative to the ground. The decrease in airspeed now results in a loss of lift at point $O_2$. The combined actions of the reduction of thrust at $O_1$, the pitch down maneuver at 5, forward acceleration at $O_2$ and the loss of lift at $O_2$ results in a larger resultant acceleration vector at $O_2$ which is directed forwardly and downwardly. If not corrected rapidly by the pilot by increasing thrust and pitching the aircraft nose up to increase its angle of attack, the aircraft will impact the ground violently at point 6. In the windshear example discussed above, it will be noted that during the transition from point $O_1$ to point $O_2$, the direction of the total acceleration vector $A_{VH}$ has undergone a large angular rotation on the order of 180°.

A windshear detector of the type sensing differences of an aircraft's inertial acceleration with respect to the sustaining airmass and capable of sensing and comparing the vertical and horizontal components of the aircraft's inertial acceleration with the vertical and horizontal components of the aircraft's acceleration relative to the airmass provides a first signal to a threshold detector responsive to signals above a predetermined magnitude. A second signal is computed from the magnitude of the detected windshear rate to provide an output representative of the maximum allowable duration the windshear can be tolerated for a given aircraft. The duration of the detected windshear rate signal is measured and compared with the computed time signal to generate a control signal from the differences of the aforesaid timing signals, so that an alarm or control system may be activated when the windshear persists for a time period greater than the computed allowable time. Thus, windshear rates of small magnitude persisting for a long time period will initiate an alarm, as will windshears of a high magnitude persisting for a short duration, so long as the detection threshold is exceeded.

BRIEF DESCRIPTION OF THE DRAWINGS

FIG. 6 is a block diagram which illustrates a preferred embodiment of the apparatus which generates the alert outputs of the windshear computer and detector of FIG. 4.

DESCRIPTION OF THE PREFERRED EMBODIMENT

Referring again to FIG. 1, the wind downburst 1 shown in FIG. 1 consists of a vertical column of air which is usually generated by severe thunderstorms and moves downward toward the ground 2 where it is deflected by the ground outward from the center of the column in all directions. While this column is illustrated as centered over the glide slope approach path to the runway, its effects are the same on the runway take-off path or if the column is laterally displaced from the flight path where there are large components of the wind in the direction of flight of the aircraft.

A very significant characteristic of the aircraft's resultant or total acceleration vector $A_{VH}$ between points $O_1$ and $O_2$ is a rotation of the direction of the vector as the aircraft enters the disturbance and leaves the disturbance. It is, therefore, an object of this invention to detect not only the change in magnitude of the resultant acceleration vector $A_{VH}$, but also to detect the rate of change of its direction and to use these characteristics to provide a warning to the flight crew. It is a further object to provide thrust and pitch guidance to enable the flight crew to avoid the dangerous condition that exists during a windshear condition, such as at point $O_2$, FIG. 1.

Figure 1:
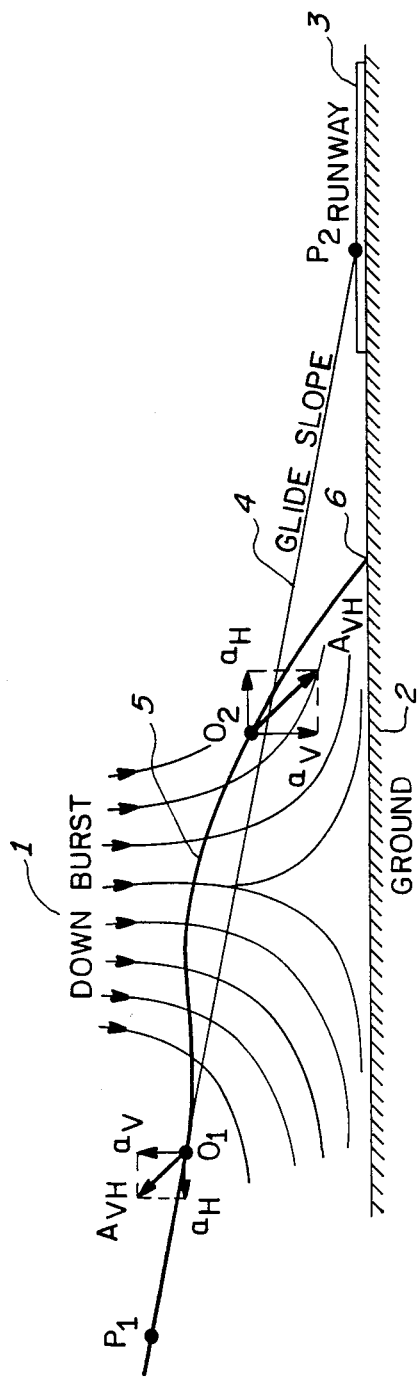
FIG. 1 is a diagram which illustrates the basic problem of an aircraft encountering a downburst windshear condition during an approach to a runway.
Figure 2:
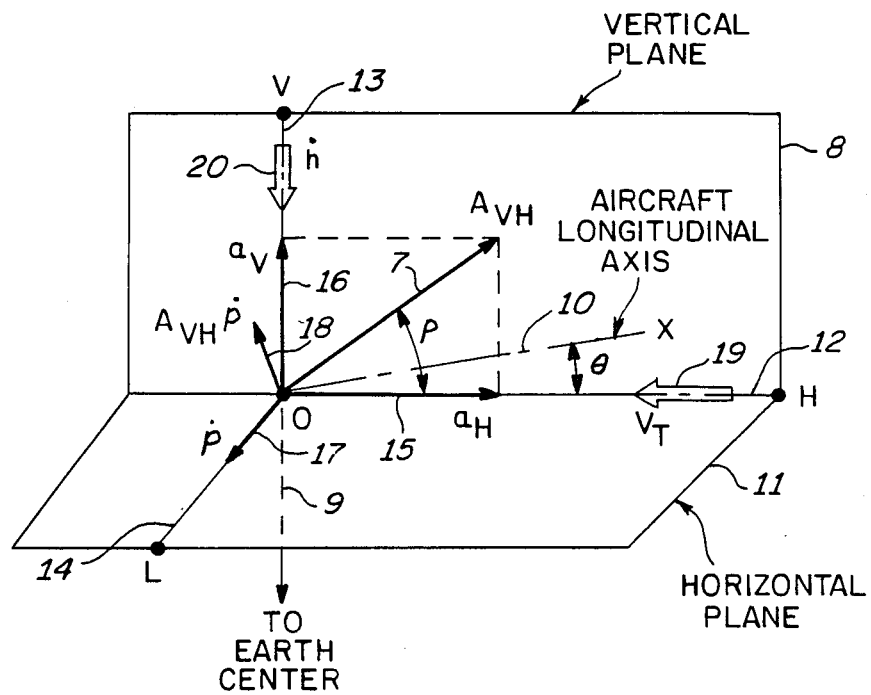
FIG. 2 is a diagram which illustrates the characteristics of the acceleration vector in the vertical plane and its relationship to aircraft movement in the air mass.

FIG. 2 illustrates the characteristics of the $A_{VH}$ acceleration vector referred to in FIG. 1. The $A_{VH}$ vector 7 is the acceleration in the vertical plane of the aircraft, considered to be a single mass at point O. The vertical plane is defined as the plane which contains the line 9 that extends from point O to the center of the earth and the aircraft longitudinal axis 10, designated as the line from O to X. The horizontal plane 11 is orthogonal to the vertical plane and also contains the aircraft point mass at O. The intersecting planes 8 and 11 form an earth reference which consists of mutually orthogonal lines 12, 13, 14. Line 12 extends between points O and H; line 13 extends between points O and V; line 14 extends between points O and L. The angle $\theta$ is the angle between reference line 12 and aircraft longitudinal axis 10. Angle $\theta$ is defined as the pitch angle of the aircraft.

Resultant or total acceleration vector 7 consists of mutually orthogonal vector components 15 and 16. Component 15, designated $a_H$, is the inertial acceleration along reference line 12; component 16, designated $a_V$, is the inertial acceleration along reference line 13. The rate of rotation of the acceleration vector 7, as would occur in the situation previously considered in FIG. 1, is the time rate of change of angle $\rho$, which is the angle between vector 7 and inertial reference line 12. The rotational rate of 7, designated $\dot{\rho}$, is depicted as the magnitude of the vector 17 which is orthogonal to the vertical plane 8 and passes through the aircraft point mass O. It is useful to consider the product of rate vector 17 ($\dot{\rho}$) and the magnitude of vector 7, $|A_{VH}|$. This product, designated $|A_{VH}|\dot{\rho}$, is a vector 18 whose direction is colinear with vector 17 in accordance with well known principles of the product of a vector and a scalar quantity. The use of this product assures that it is nominally near zero for small values of $A_{VH}$ (in the absence of vertical wind gusts) regardless of the value of $\dot{\rho}$ and likewise is near a null for small values of $\dot{\rho}$ (when the rotation rate of the total acceleration vector is essentially zero) regardless of the magnitude of $A_{VH}$. Thus, significant values of $|A_{VH}|\dot{\rho}$ require both a significant magnitude of the acceleration vector and a significant rotation rate of the total acceleration vector, both of which together are indicative of a dangerous windshear condition. Accordingly, while neither $A_{VH}$ nor $\dot{\rho}$ by itself may be representative of a dangerous windshear, when they both occur at the same time, it indicates that a dangerous windshear exists.

The aircraft longitudinal axis 10 has a movement relative to the air mass. This movement can be conveniently considered to be comprised of two orthogonal velocity components 19 and 20, existing along lines 12 and 13, respectively. True airspeed is generally designated $V_T$ and is measured along the flight path of the aircraft by a conventional air data computer. It is sufficiently accurate for the purpose of the present invention to consider that $V_T$ coincides with vector 19 since the angle between the aircraft flight path and reference line 12 is usually small for large aircraft such as transport aircraft. Vertical speed, designated $\dot{h}$, is also calculated by a conventional air data computer and is derived from the rate of change of the atmospheric static pressure existing around the aircraft.

If the aircraft is not being subjected to windshear conditions, the time rate of change of true airspeed 19, designated $\dot{V}_T$, essentially equals the horizontal inertial acceleration component 15. Similarly, the time rate of change of vertical speed 20, designated $\ddot{h}$, essentially equals the vertical inertial acceleration component 16. However, these two relationships, i.e., $\dot{V}_T = a_H$ and $\ddot{h} = a_V$, are disturbed during windshear conditions, such as described in FIG. 1, and the magnitude of the disturbance is indicative of the strength of the windshear. As previously discussed, windshear conditions also result in a rotation $\rho$ of the acceleration vector 7, the rate of such rotation also being indicative of the strength or severity of the windshear. The apparatus of the present invention measures and utilizes disturbances in the foregoing relationships as criteria for detecting the magnitude and direction of any windshear that may surround the aircraft.

These disturbances are designated A through E and are summarized as follows:

$$A = \ddot{h} - a_V \quad (1)$$

$$B = \dot{V}_T - a_H \quad (2)$$

-continued $$C = \frac{d}{dt}(\ddot{h} - a_V) \quad (3)$$

$$D = \frac{d}{dt}(\dot{V}_T - a_H) \quad (4)$$

$$E = |A_{VH}|\dot{\rho} \quad (5)$$

In order to use available on-board sensors, it is convenient to express equation (5) in terms of $a_V$ and $a_H$ in equation (12) below. Its derivation is as follows, referring to FIG. 2:

$$A_{VH}^2 = a_V^2 + a_H^2 \quad (6)$$

$$\sin\rho = \frac{a_V}{|A_{VH}|} \quad (7)$$

$$\cos\rho = \frac{a_H}{|A_{VH}|} \quad (8)$$

$$\frac{d}{dt}(\sin\rho) = \dot{\rho}\cos\rho = \frac{d}{dt}\frac{a_V}{|A_{VH}|} \quad (9)$$

Solving for $\dot{\rho}$ in equation (9) and substituting equation (8) therein:

$$\dot{\rho} = \frac{|A_{VH}|}{a_H} \cdot \frac{d}{dt}\left[\frac{a_V}{|A_{VH}|}\right] \quad (10)$$

hence $$|A_{VH}|\dot{\rho} = \frac{A_{VH}^2}{a_H} \cdot \frac{d}{dt}\left[\frac{a_V}{|A_{VH}|}\right] \quad (11)$$

Now substituting equation (6) into equation (11) and simplifying $$|A_{VH}|\dot{\rho} = \left[\frac{a_V^2 + a_H^2}{a_H}\right] \cdot \frac{d}{dt}\left[\frac{a_V}{\sqrt{a_V^2 + a_H^2}}\right] \quad (12)$$

The above derivation of equation (12) provides a measurement of the disturbance parameter $|A_{VH}|\dot{\rho}$ from direct measurements of linear accelerations acting on the aircraft and available from the same horizontal and vertical accelerometers strapped to the airframe as used in equations (1) through (4).

Figure 3:
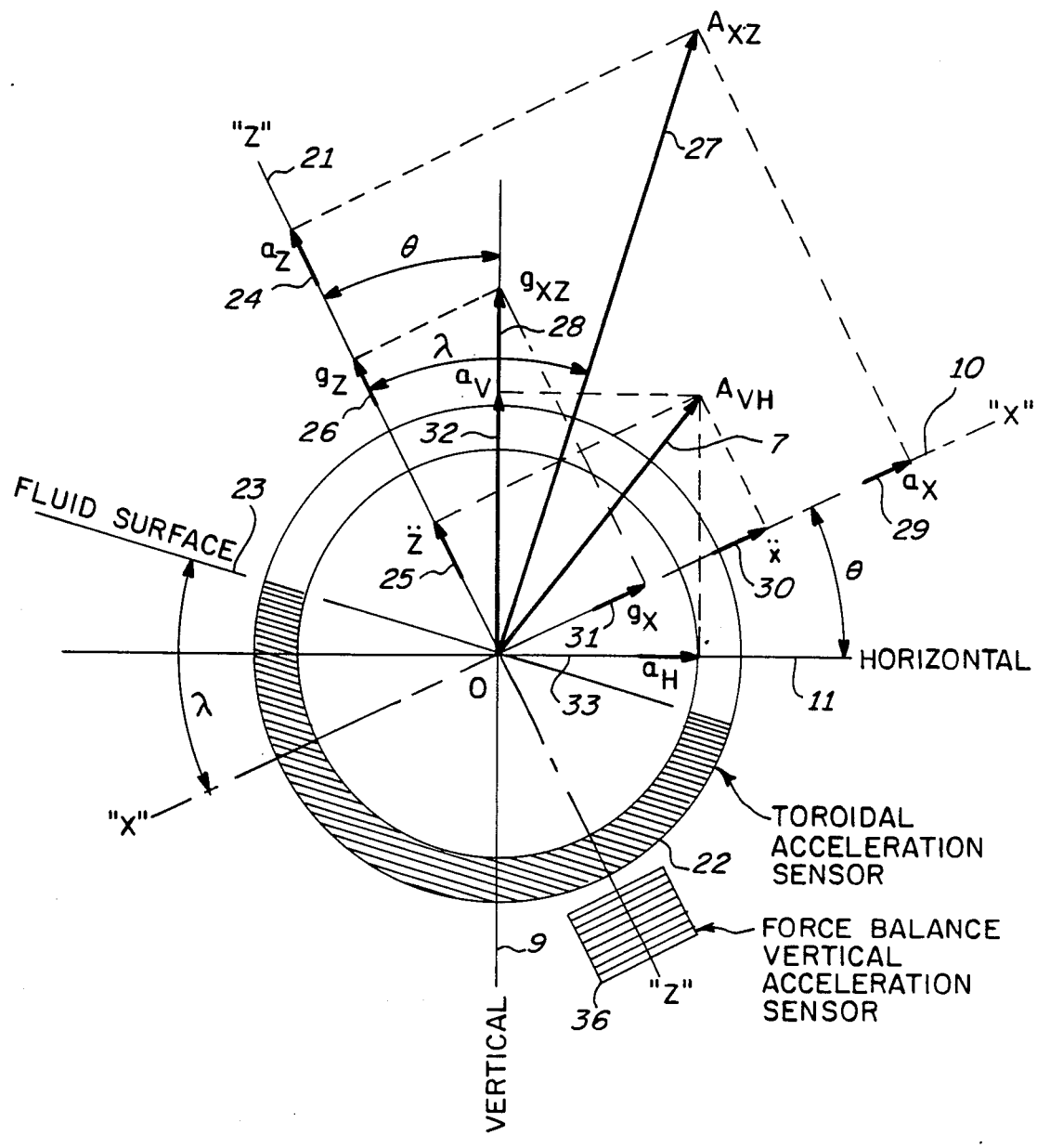
FIG. 3 is a diagram which indicates the effects of normal and longitudinal acceleration on the configuration of a liquid level toroidal sensor which is mounted on the longitudinal axis of the aircraft.

A preferred embodiment of the accelerometer configuration for use in determining the $a_V$ and $a_H$ components of the total acceleration vector, $A_{VH}$, is illustrated in FIG. 3. In order to improve the clarity of the description, FIG. 3 has been drawn to illustrate the special case where the bank angle of the aircraft is zero; that is, wings level flight which is the usual approach and take-off attitude at lower altitudes. The relationships derived for $a_V$ and $a_H$, however do include the effects of bank angle in accordance with well known principles. The aircraft bank angle is designated $\phi$ in this discussion.

The accelerometer configuration comprises a conventional force balance linear accelerometer 36, mounted with its sensing axis aligned with the Z axis 21 of the aircraft and a toroidal liquid level, or acceleration sensor 22, mounted in the X-Z plane of the aircraft, having an electrical null when the liquid surface 23 is parallel with the longitudinal X axis 10 of the aircraft. The toroidal accelerometer may be of the type disclosed in the present assignee's U.S. Pat. Nos. 4,028,815, 3,823,486, 3,604,275, and 3,171,213.

Under the conditions shown in FIG. 2, the aircraft's X axis 10 has an attitude $\theta$ with respect to the horizontal plane 11 which is normal to the vertical line 9 (see also FIG. 2), which extends from the center O of the toroid to the center of the earth. The angle $\theta$ is measured in a conventional manner by a vertical gyro, also mounted in the aircraft.

The Z reference line 21 is orthogonal to the X reference line 10, both of which are fixed to the vertical and longitudinal axes respectively of the fuselage of the aircraft. The normal accelerometer 36 is mounted with its sensing axis parallel to the aircraft Z axis 21. It responds to the apparent acceleration component along the Z axis in the X-Z plane of the aircraft. The apparent acceleration component 24, designated $a_Z$ in the diagram, is the sum of the true normal acceleration component 25, designated $\ddot{Z}$ and the component 26, designated $g_Z$, of the earth gravity vector that exists in the longitudinal plane of the aircraft, X-Z.

The earth gravity vector, g, is of course always aligned with the vertical reference line 9. The gravity vector is resolved into orthogonal components, projected onto the X, Y and Z axes of the aircraft. The lateral or Y axis has been omitted from FIG. 3 in order to improve its clarity. It can be considered, however, to be a line which extends from the center of the toroid O at right angles to the plane of the diagram of FIG. 3. The components of the earth gravity vector are well known and can be expressed by the following general relationships which include the effect of bank angle or non-level flight:

$$g_X = g\sin\theta \quad (13)$$

$$g_Y = g\cos\theta\sin\phi \quad (14)$$

$$g_Z = g\cos\theta\cos\phi \quad (15)$$

where $\theta$ and $\phi$ are the aircraft's pitch and bank angles respectively and are measured by the vertical gyro in the aircraft in a conventional fashion.

The apparent acceleration vector 27 in the longitudinal plane of the aircraft is designated $A_{XZ}$. For the case where bank angle $\phi$ is zero, it is the vector sum of the true acceleration vector 7 designated $A_{VH}$, and the gravity vector 28, designated $g_{XZ}$, existing in the XZ plane. The components of vector 27 in aircraft Z and X axes are 24 and 29, designated $a_Z$ and $a_X$, respectively. Using relationships 13 and 15, the value of these vectors are expressed as $$a_X = g_X + \ddot{X} = g\sin\theta + \ddot{X} \quad (16)$$

$$a_Z = g_Z + \ddot{Z} = g\cos\theta\cos\phi + \ddot{Z} \quad (17)$$

where the earth gravity components $g_Z$ and $g_X$ are vectors 26, 31 and where $\ddot{X}$ and $\ddot{Z}$ are vectors 30 and 25 which are the components of the true acceleration vector 7 along the X and Z axes, respectively, of the aircraft.

The angle $\lambda$ in the diagram is the angle between the acceleration vector 27 and the Z axis 24 of the aircraft. It is equal to the angle between the aircraft X axis 10 and the surface 23 of the fluid in the toroidal accelerometer 22 since the liquid surface will always be normal to the apparent acceleration vector 27. It therefore follows that the electrical output of the toroid accelerometer 22 is proportional to the angle λ because the toroid is positioned in the aircraft to have an electrical null when the liquid surface 23 is parallel with the X axis 10 of the aircraft. The angle λ is related to the components of the apparent acceleration vector 27 as follows:

$$\tan \lambda = \frac{a_X}{a_Z} \quad (18)$$

Using the relationships (13) through (18), the inertial vertical acceleration component 32, designated $a_V$, and the inertial horizontal acceleration component 33, designated $a_H$, can be expressed in a general form (which also includes the effect of bank angle for completeness):

$$a_V = \ddot{Z} \cos \theta \cos \phi + \ddot{Y} \cos \theta \sin \phi + \ddot{X} \sin \theta \quad (19)$$

$$a_H = \ddot{X} \cos \theta - \ddot{Z} \sin \theta \cos \phi \quad (20)$$

where:

$$\ddot{Z} = a_Z - g \cos \theta \cos \phi \quad (21)$$

$$\ddot{Y} = a_Y - g \cos \theta \sin \phi \quad (22)$$

$$\ddot{X} = a_X - g \sin \theta \quad (23)$$

However, in a coordinated turn, it can be assumed that:

$$a_Y = 0 \quad (24)$$

$$\ddot{Y} = -g \cos \theta \sin \phi \quad (25)$$

Therefore, relationships (19) and (20) can now be expressed:

$$a_V = a_Z (\cos \theta \cos \phi + \tan \lambda \sin \theta) - g \quad (26)$$

$$a_H = a_Z (\tan \lambda \cos \theta - \sin \theta \cos \phi) - g \sin \theta \cos \theta \sin^2 \phi \quad (27)$$

The relationships (26) and (27) involve direct measurements from the normal accelerometer 36 ($a_Z$), the toroidal accelerometer 22 (λ) and a vertical gyro 34 ($\theta$, $\phi$).

Figure 4:
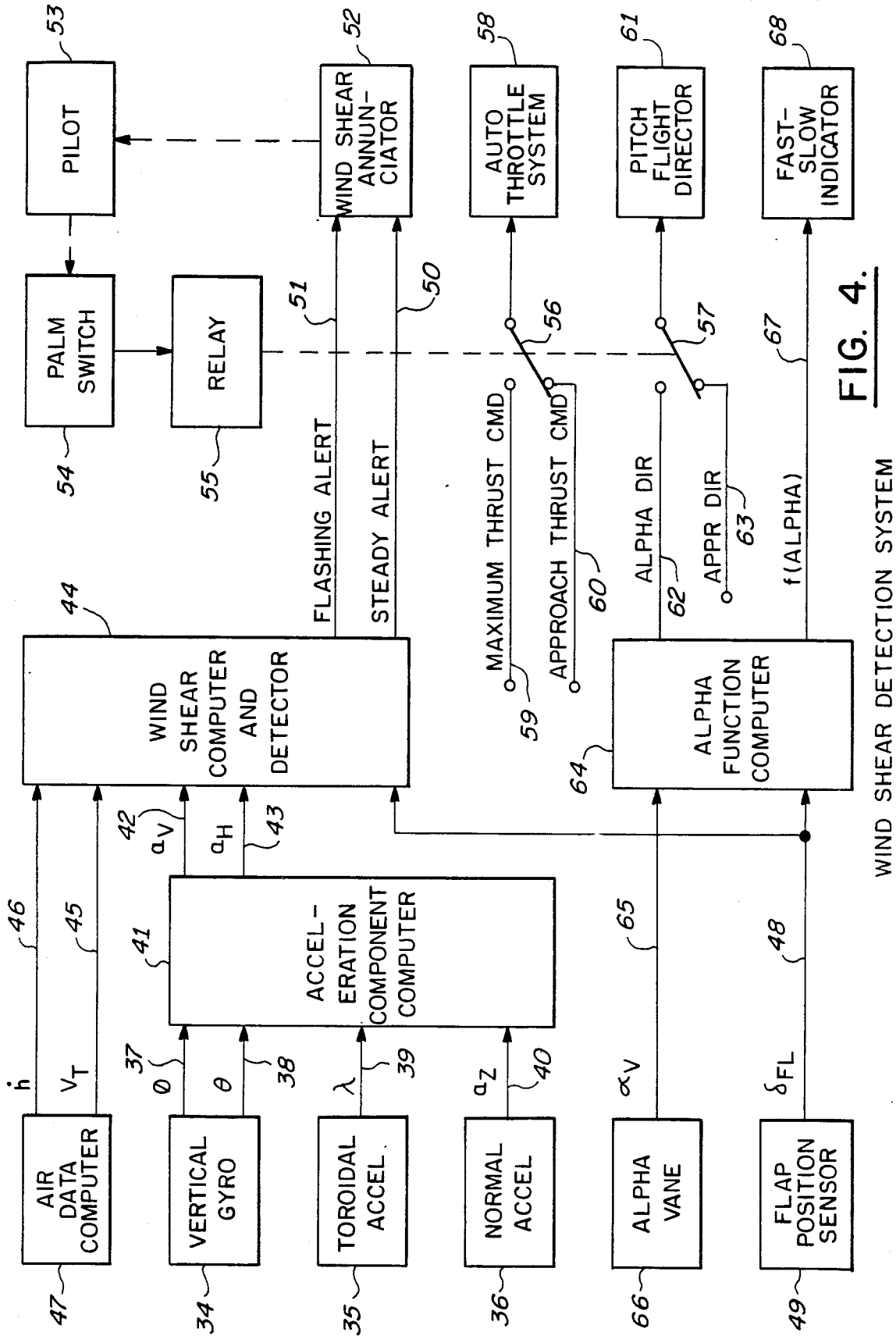
FIG. 4 is a block diagram which illustrates a preferred embodiment of the windshear detection and warning system.

Referring now to FIG. 4, a block diagram of a preferred embodiment of the windshear detection, warning and correction system is illustrated. This system may be an integral part of an aircraft performance management system (PMS). While the embodiment is shown in analog form for convenience of demonstrating the structure it preferably constitutes a separate digital computer subroutine of the PMS.

The vertical gyro 34, toroidal accelerometer 35 and normal accelerometer 36, having respective signal outputs 37, 38, 39, 40 are processed by the acceleration component computer 41 to provide $a_V$ and $a_H$ output signals 42, 43 in accordance with equations (26) and (27), previously defined. The component computer or data processor 41 for solving equations (26) and (27) is completely conventional and may be readily implemented by those skilled in this art using well known digital computer component conversion subroutines. The outputs 42 and 43 of the component computer 41 are the vertical and horizontal accelerations of the aircraft relative to the earth coordinates, i.e., relative to the ground.

Outputs 42, 43 in conjunction with true airspeed output 45, designated $V_T$, and vertical speed output 46, designated h, of air data computer 47 together with flap position output 48, (designated $\delta_{FL}$,) of flap position sensor 49 are processed by windshear computer and detector 44 to derive disturbance relationships (1) through (5), defined previously. The details of the windshear computer and detector and warning signal generator 44 will be described hereinbelow with reference to FIGS. 6 and 7. As will be described there, the disturbance relationships are combined in a manner to provide a two-level alert signal. The first level represents a moderate windshear condition and is manifested as a steady alert signal 50 which illuminates a warning light on windshear annunciator 52. The second level represents a severe windshear condition and is manifested as a flashing illumination of the warning light by alert signal 51. A corresponding audible warning may also preferably be provided.

The pilot will acknowledge the alert and warning at his discretion and operate a palm switch 54 which, in most large aircraft, is located on the throttle control levers and normally used to initiate a missed approach maneuver. The palm switch 54 latches a relay 55, having contactors 56 and 57. The function of contactor 56 is to transfer the autothrottle system 58 to operate at maximum thrust command 59 in lieu of the normal approach thrust command 60, which was the situation shown in FIG. 1. The function of contactor 57 is to transfer the pitch flight director 61 to operate on an angle of attack director signal 62 in lieu of the normal approach director signal 63, which was the situation shown in FIG. 1. Thus, in accordance with the present invention, not only is a warning given to the pilot when the aircraft experiences a windshear condition, it also provides guidance information to the pilot to enable him to maneuver the aircraft promptly and safely to avoid a dangerous situation. Upon actuation of the palm switch 54, the alpha function computer, to be described more fully below, supplies a command signal which will direct the pilot to pitch the aircraft to its maximum safe angle of attack. Normally, this angle of attack is approximately that of the stick shaker angle of attack, that is, just below the stall angle of attack. The alpha function computer also provides an angle of attack deviation signal to the fast-slow indicator 68 to provide an analog display which shows the actual aircraft situation relative to the stick shaker angle of attack.

It will now be appreciated that the aircraft will be commanded to its maximum lift configuration and avoid the windshear problem discussed with respect to FIG. 1. It is important to note that by issuing flight director command and autothrottle commands automatically, the pilot will be guided to follow an abnormal procedure rather than his normal instincts as described previously.

Figure 5A:
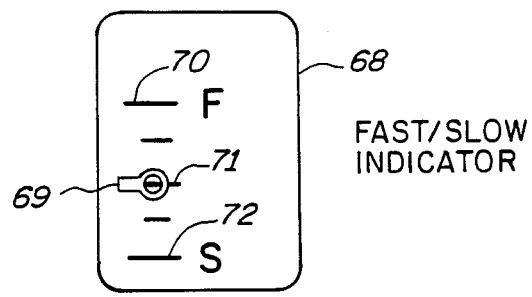
FIGS. 5A and 5B present a preferred embodiment of the angle of attack display used in the windshear detection and warning configuration shown in FIG. 3.
Figure 5B:
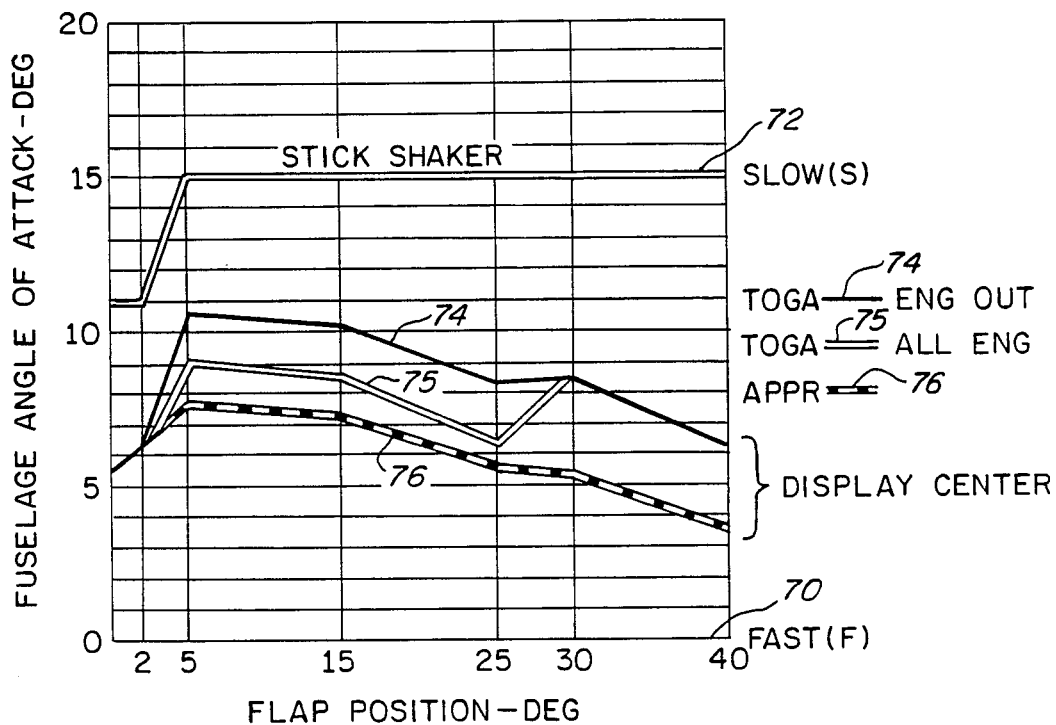

The alpha function computer 64 is used to process signal 65 from a local alpha vane 66 and flap position sensor output 48 to generate a true angle of attack value. The angle of attack signal 67 operates into a fast-slow indicator 68, as shown in FIGS. 5A and 5B. The alpha function generator is illustrated in block diagram format in FIG. 9. As shown, it is responsive to a signal on lead 65 proportional to the aircraft angle of attack $\alpha_V$, usually provided by a conventional vane sensor 66. It is also responsive to a signal on lead 48 proportional to the position of the flaps, $\delta_{FL}$.

Figure 7:
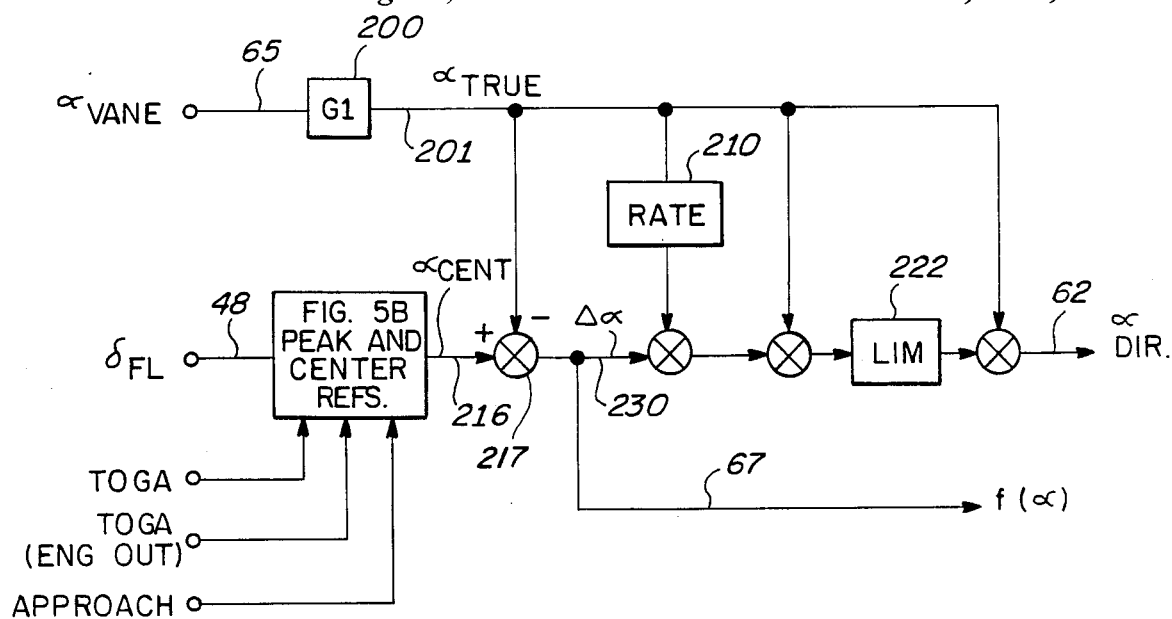
FIG. 7 is a block diagram of the alpha function computer of FIG. 4.

The details of the angle of attack function computer 64 are shown in FIG. 7. Basically, computer 64 provides a signal proportional to the error between the actual angle of attack of the aircraft and a center reference angle of attack for the particular mode of operation of the aircraft as shown in FIG. 5B for display, together with a peak angle of attack reference for use as an angle of attack command for the flight director. The angle of attack vane signal on lead 65 is passed through suitable gain 200 and provides on lead 201 a signal proportional to the true angle of attack or alpha of the aircraft. The flap angle signal on lead 48 is supplied to a source of rerference angle of attack signal depending upon flight mode. It will be recalled in the discussion of FIG. 5B above that these reference angle of attack signals are a function of flap position and whether the aircraft is in an all engine TOGA mode, an engine out TOGA mode or in an approach mode and that these reference alpha signals correspond to a centered position of the fast/slow indicator 68. The discretes TOGA (ENG OUT), TOGA (ALL ENG), and APPR are supplied conventionally from the mode initiation switches which in turn supply reference alpha voltages on lead 216 in accordance with the curves shown in FIG. 5B. These reference voltages are identified as $\alpha_{CENT}$ since they represent the center position of the fast/slow indicator 68. The alpha reference signals are compared with the actual alpha signal on lead 201 at summing junction 217 to provide an alpha error signal $\Delta\alpha$ on lead 230. This is the signal supplied to the fast/slow meter 68 via lead 67.

The alpha error signal on lead 230 is supplied also to the flight director pitch command cue after being conditioned for flight director operation. This simply involves the addition of a damping term from rate taker 210 and conventional limiting by means of limiter 222. The final flight director alpha command signal appears on lead 62 which energizes a conventional flight director visual cue.

The fast/slow indicator 68 shown on FIG. 5A comprises a cue 269 which moves vertically against a fixed scale having an upper index 270, marked F, a center index 271 and a lower index 272, marked S. The characteristics of the angle of attack signal 67, FIG. 4, are such that the moving cue 269 will be positioned against the F index 270 when the true fuselage angle of attack of the aircraft is zero degrees. The cue will be positioned at the S index 272 when the true fuselage angle of attack is at a value corresponding to the stick shaker threshold. As stated above, the stick shaker is designed to provide an alert to the flight crew that the aircraft is nearing a stall condition.

When the moving cue 269 is adjacent to the center index 271, it indicates proper angle of attack for three separate conditions, designated 274, 275, 276 in the graphical plot of FIG. 5B which represents reference fuselage angle of attack values as functions of flap position. These values are the stick shaker reference 272, the zero angle of attack reference 270 and the three center conditions which are all-engine takeoff/go-around (TOGA) 275, the failed engine TOGA 274 and the normal approach condition 276. The center values 274, 275, 276 serve as a valuable cross check on the validity of the signals since the flight crew can compare the airspeeds that exist when the angle of attack display is centered under normal conditions.

FIG. 6 is a preferred embodiment of the windshear computer and detector 44, FIG. 4. The sensor input signals to the windshear computer are 42, 43, 45, 46 as depicted in FIG. 4 and repeated in FIG. 6. Filters 69, 70, 71, 72 operate on the sensor signals 42, 43, 45, 46 to reduce the spurious noise that is a general characteristic of accelerometer and air data signals. The time constants of filters 69, 70, 71, 72 are all preferably identical in order to maintain a proper dynamic relationship between the signals.

Figure 8:
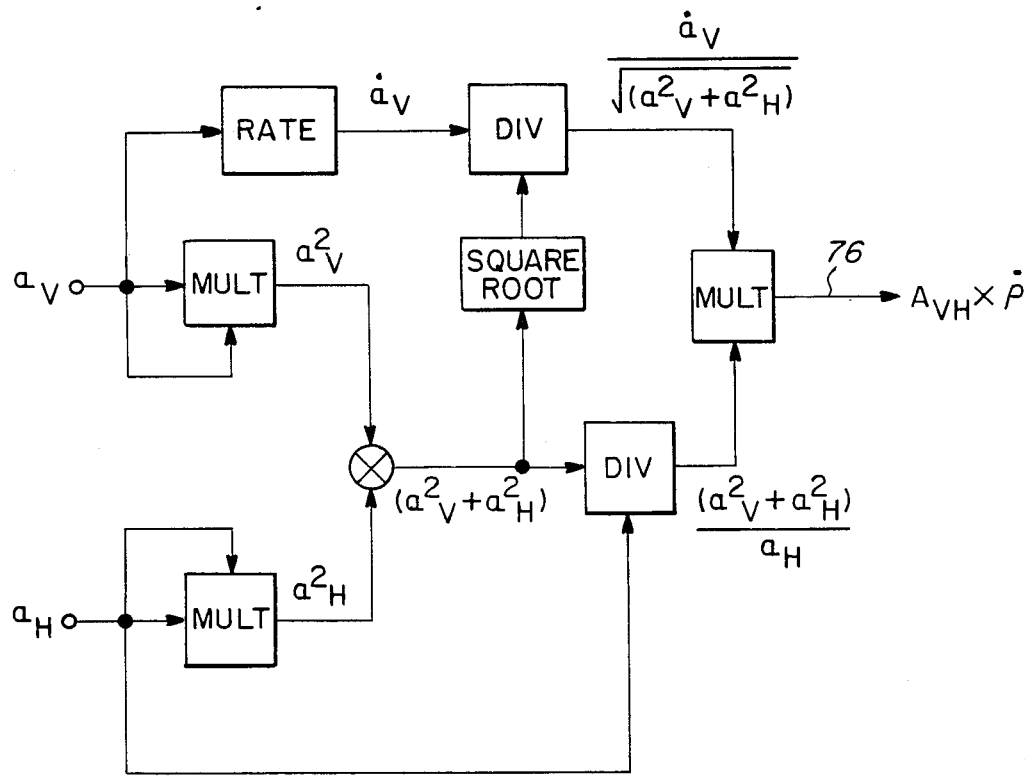
FIG. 8 is a block diagram of the data processor of FIG. 6.

The filtered $a_V$ and $a_H$ signals 42 and 43 are subjected to washouts 73 and 74 in order to remove any steady state stand-off signals which are also characteristic of accelerometer signals. The time constants of the washouts 73 and 74 are again preferably identical in order to maintain a proper dynamic relationship between the $a_V$ and $a_H$ signals. The washed out and filtered $a_V$ and $a_H$ signals are processed by data processor 75 to generate output signal 76 which represents the solution to the mathematical relationship 12, discussed above and which is the vector 18, FIG. 2, and is the vector product of $|A_{VH}|$ and $\dot{\rho}$. A block diagram of the data processor 75 is shown in FIG. 8. It will be appreciated that the data processor conventionally implements equation 12 and a detailed description thereof would be superfluous.

Normal extensions and retractions of aircraft flaps will result in sizeable acceleration vectors which must be compensated in order to avoid nuisance trips of the alert or warning signals. This is obtained by the variable gain block 77 which responds to signals on lead 48 proportional to movement of the flap position sensor 49, FIG. 4. This is processed through a rate taker 78 and absolute value detector 79 to generate a variable gain characteristic shown by the graph 80. Graph 80 shows that movement of the flaps results in a reduction in the gain of signal 76 which gradually recovers with time. A typical time period between the movement of the flaps and the recovery of substantially the full signal may be on the order of 60 seconds. The output of variable gain 77 is filtered by smoother filter 81 before entrance into level detector E where a high logic output is provided on terminal 83 when the output of filter 81 exceeds a preset negative value. Level detector 82 also provides a similar high logic signal for a positive signal. The logic signals on terminals 83 and 84 reflect disturbance relationship (5) above.

The filtered vertical speed signal 46 is operated on by washout 89 and rate taker 85 to generate an air data derived acceleration signal 86, designated $\dot{h}$, which is aircraft vertical acceleration relative to the air mass. This is compared to filtered inertial acceleration $(a_V)$ signal 87 at summing junction 88 and then filtered at 90. The output from filter 90 is entered into 91, level detector A, where a high logic output is provided on terminal 92 when the output of filter 90 exceeds a preset positive or negative value. The logic signal on terminal 92 reflect the disturbance relationship (1) above.

The filtered true airspeed signal is operated on by washout 97 and rate taker 093 to generate an air data derived acceleration signal 94, designated $\dot{V}_T$, which is aircraft forward acceleration relative to the air mass. This is compared to filtered inertial acceleration $(a_H)$ signal 95 at summing junction 96 and then filtered at 98. The output from filter 98 is entered into 99, level detector B, where a high logic output is provided on terminal 100 when the output of filter 98 exceeds a preset positive or negative value. The logic signal on terminal 100 reflects the disturbance relationship (2) above.

The signal 101 represents processed signal $\dot{h} - a_V$. This signal is further processed by rate taker 102 and filter 103 prior to entrance into 104, level detector C, where high logic outputs are provided on terminals 105 and 106. Terminal 105 represents a negative disturbance; terminal 106 represents a positive disturbance in accordance with relationship (3) above, both greater than a predetermined threshold value.

Signal 107 represents processed signal $\dot{V}_T - a_H$. This signal is further processed by rate taker 108 and filter 109 prior to entrance into 110, level detector D, where high logic outputs are provided on terminals 111 and 112. Terminal 111 represents a negative disturbance; terminal 112 represents a positive disturbance in accordance with relationship (4) above, both greater than a predetermined threshold value.

Two levels of alert are provided, one representing a moderate windshear condition; the other representing a severe windshear condition.

Figure 9:
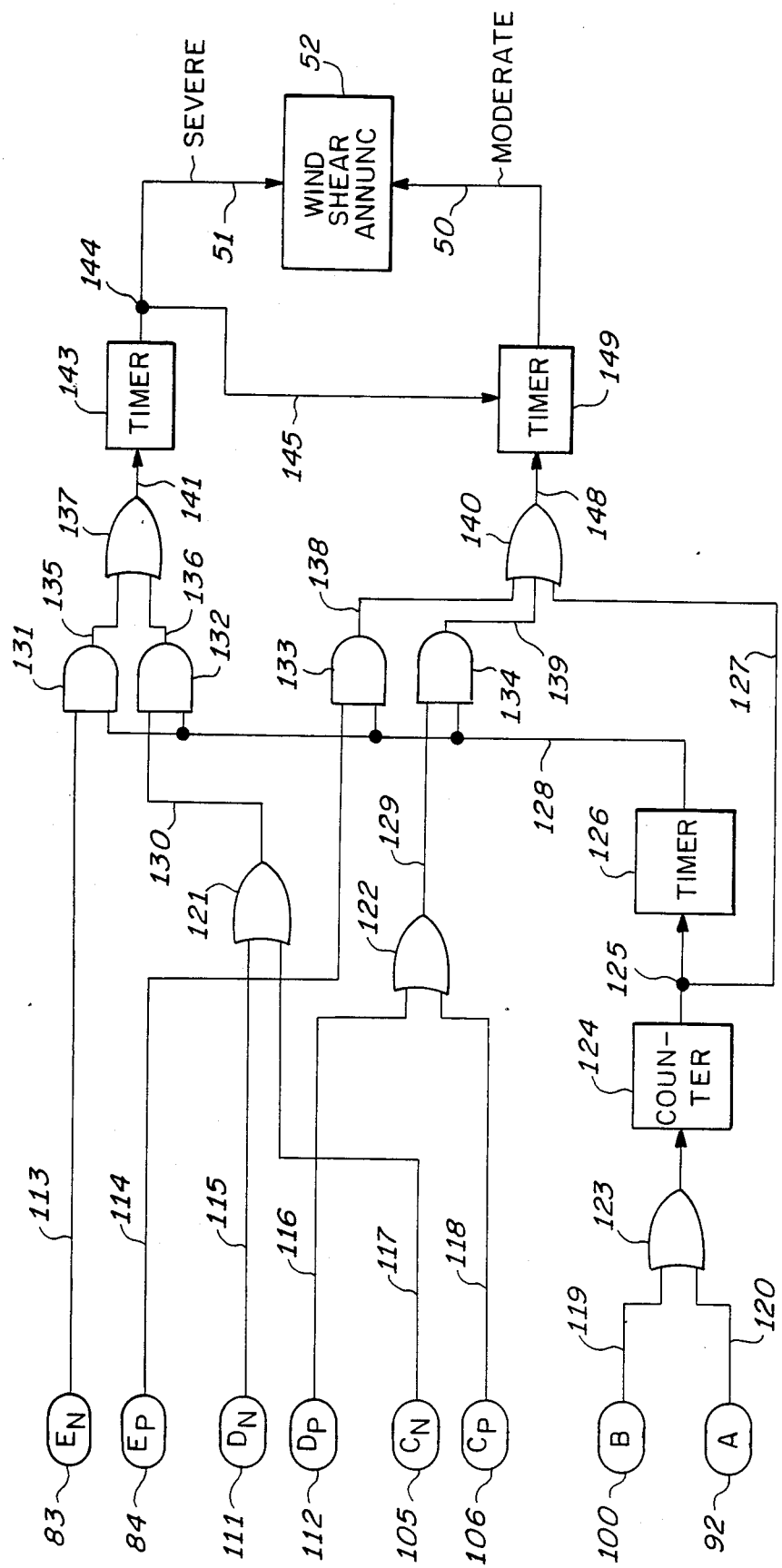
FIG. 9 is a diagram of the switching logic used to control the two level warning annunciator of FIG. 4.

Referring to FIG. 9, as discussed previously, logic levels indicative of windshear appear on terminals 83, 84, 111, 112, 105, 106, 100 and 92 of FIG. 6. The logic levels from terminal B, 100, and terminal A, 92 are supplied to conventional logic "OR" gate 123 via leads 119 and 120, respectively. Thus, the output of "OR" gate 123 will be a high logic signal if either or both leads 119 and 120 has a high logic signal. Counter 124 will output a high logic level signal if the output of gate 123 remains at a high logic level for a predetermined length of time, for example, three seconds. Otherwise, the output of counter 124 is maintained at a low logic signal.

The output of counter 124 appears at junction 125, one lead from which supplies timer 126,. Timer 126 will output a high logic signal for a predetermined amount of time, for example, 20 seconds. If the output of counter 124 is ever at a high logic level, even momentarily, the output of timer 126 appears on lead 128 which is impressed as one input to conventional logic "AND" gates 131, 132, 133 and 134.

The logic signal from terminal 83 appears on lead 113 and is impressed as one input to logical "AND" gate 131. The output of gate 131 appearing on lead 135 can be a high logic level signal if and only if the logical levels on leads 113 and 128 are high logic level signals.

The logic signal levels appearing at terminals 111 and 105 are impressed on conventional logical "OR" gate 121. The output of gate 121 on lead 130 will thus be a high logic signal if either or both leads 115 and 117 has a high logic signal. The logic signal level on lead 130 is impressed on conventional logical "AND" gate 132. The output of gate 132 appearing on lead 136 can thus be a high logic level signal if and only if the logical levels on leads 130 and 128 are high logic level signals.

The logic levels appearing on leads 135 and 136, discussed above, are impressed on conventional logical "OR" gate 137. The output of gate 137 appears at junction 141, one lead from which is impressed on timer 143. Timer 143 will output a high level logic signal for a predetermined time, for example, 10 seconds, if a high logic level signal appears at junction 141, even momentarily. If, at the completion of the predetermined time, a high logic level signal remains on lead 141, the timer will again output a high logic level signal for the predetermined time. Otherwise, the output of timer 143 will become a low logic level signal. The output of timer 143 appears at junction 144 and thence on lead 51 which is supplied to windshear annunicator 52. A high logic level signal on lead 51 causes a flashing windshear annunciation.

The logic level signal on terminal 84 appears on lead 114 and is thence supplied as one input to conventional logical "AND" gate 133. The output of gate 133 appears on lead 138 and will be a high logic level signal if and only if the logic level signals on leads 114 and 128 are high logic level signals.

The logic level signals from terminals 112 and 106 appear on leads 116 and 188 respectively and are thence supplied as inputs to conventional logical "OR" gate 122. The output of gate 122 appears on lead 129. The logic level signal on lead 129 will be a high logic level signal if either or both of leads 116 and 118 has a high logic level signal. The logic level signal on lead 129 is supplied as one input to conventional logical "AND" gate 134. The output of gate 134, appearing on lead 139, will be a high logic level signal if and only if the logic level signals on leads 129 and 128 are high logic level signals.

Conventional logical "OR" gate 140 receives as inputs the signals on leads 138, 139 and 127. The output of gate 140 will be a high logic level signal if any one or any combination of the inputs in the aforementioned leads is a high logic level signal.

The output of gate 140 appears on lead 148 and is thence impressed on timer 149. Timer 149 operates in a manner similar to timer 143, discussed above. A high logic level signal output from timer 149, on lead 50, will cause a steady windshear annunication.

The logic level appearing at junction 144 and on lead 145 is impressed on timer 149 such that a high logic level signal will cause an instantaneous low logic level signal on lead 50 regardless of the value of the logic level signal on lead 148 or the amount of elapsed time of timer 149. This action allows the flashing windshear annunication to take precedence over the steady windshear annunication should both events occur simultaneously.

The windshear detection logic provides the following features:

(A) the moderate windshear alert is generated when the input to detector A or the input to detector B rise above positive or negative preset trip levels for a predetermined amount of time. The moderate windshear alert remains active until the input to detector A and the input to detector B both drop below the trip level.

(B) Detectors C, D and E are armed to operate for a time interval which starts when the moderate windshear alert is actuated and ends a predetermined amount of time after the inputs to detectors A and B have fallen below the preset trip levels.

(C) When armed, positive polarity trips of detectors C, D and E will also operate the moderate windshear alert annunciation.

(D) When armed, negative polarity trips of detectors C, D, and E will operate the severe windshear alert annunciation.

Clearly, it is desirous to minimize or eliminate nuisance or false warnings of windshear to the flight crew. The important aspects of windshear are both the magnitude and duration of the shear. For example, common turbulence may create a change in wind speed sufficient to cause large excursions in aircraft true airspeed, but the duration of the change is so short as to pose no serious threat to safety of flight. Conversely, windshear can not only cause large airspeed excursions but can endure sufficiently long enough to endanger the aircraft. Hence, an important part of the windshear detection is consideration of both the magnitude and length of time of the windshear.

A further preferred embodiment of the present invention incorporates the determination of both the magnitude of the shear and the allowable time the shear can be tolerated at that magnitude. A description of the technique used follows.

Figure 10:
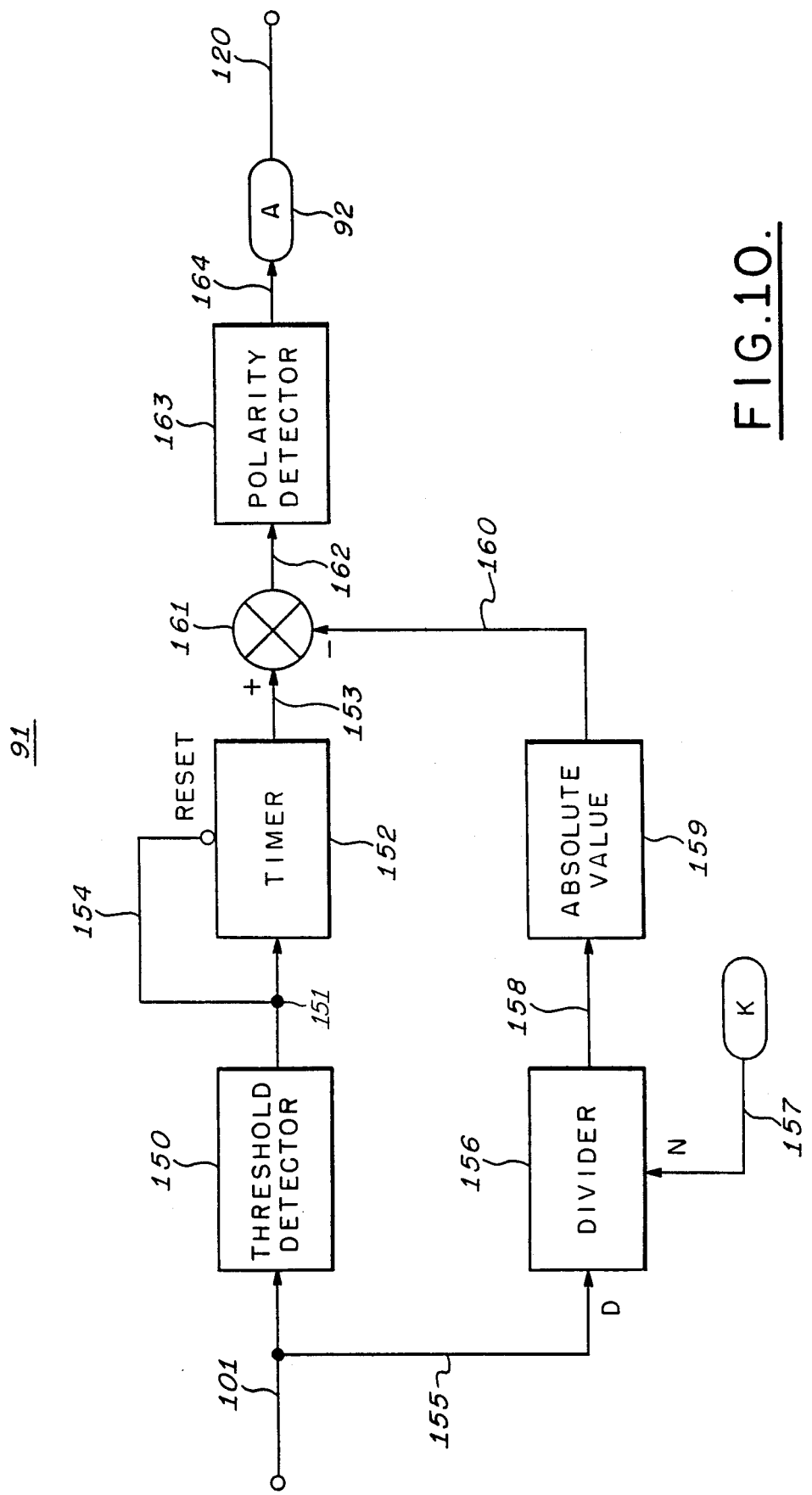
FIG. 10 is a block diagram which illustrates a windshear detection circuit useful in the circuit of FIG. 6.

Referring again to FIG. 6, the action of detector 91 is replaced by the circuit of FIG. 10. The signal on lead 101 of FIG. 6 is supplied to threshold detector 150. Threshold detector 150 operates in such a fashion as to output a logical 1 on lead 151 if the signal on lead 101 exceeds a predetermined value, for example 0.02 g, whether positive or negative in sign, where g has a value of 32 feet per second per second. Detector 150 outputs a logical 0 for values less than the predetermined value. The output of threshold detector 150 is supplied to timer 152. The output of timer 152 appears on lead 153 and is a signal proportional in magnitude to the elapsed time since the signal on lead 151 was triggered to become a logical 1. Lead 151 also supplies lead 154 and thereby provides the reset function of timer 152, the circle terminating lead 154 representing a logical NOT function. By the described action, timer 152 will output a continuous signal proportional to elapsed time on lead 153 whenever the signal on lead 151 is a logical 1 and will output a null whenever the signal on lead 151 is a logical 0.

Simultaneously, the signal on lead 101, representing the longitudinal wind rate, appears on lead 155 and thereby is applied as the denominator to conventional divider 156. A constant value, K, which is representative of the maximum allowble time the windshear can be tolerated and has, for example, a value of 0.237 G-seconds, appears on lead 157 and is supplied as the numerator for divider 156. K may be indicative of a power-to-weight ratio. Divider 156 produces the quotient of the value of the signals on leads 155 and 157 which is applied to lead 158. The signal on lead 158 is representative of the allowable time that the windshear may be endured at the current measured magnitude. It will be seen that the signal has units of seconds when the magnitude of the windshear is measured in gravitational units (G). The signal on lead 158 thereby defines curve 208 on FIG. 11. Lead 158 is coupled to conventional absolute value taker 159. Absolute value taker 159 operates in such a fashion as to provide a positive value signal on lead 160 equal in magnitude to the value on lead 158. The output of absolute value taker 159 appears on lead 160 and feeds conventional summation device 161.

Conventional summation device 161 receives signals from leads 153 and 160 and produces the algebraic sum in the sense of a numerical difference on lead 162. The signal on lead 162 represents the difference between the actual elapsed time of the wind rate condition on lead 153 and the computed allowable time which appears on lead 160. Lead 162 supplies conventional polarity detector 163. Polarity detector 163 operates in such a fashion as to output a logical 1 on lead 164 to terminal A (92 of FIG. 6) whenever the signal on lead 162 is positive in sign; that is, whenever the actual elapsed time exceeds the computed allowable time. For a null or negative signal on lead 162, the output of polarity detector 163 will be a logical 0.

The logical signal on lead 164 and terminal A reflects the vertical windshear disturbance relationship of equation (1), discussed above. This signal may be used to activate a visible and/or audible alarm, as in the present invention, or to enable a windshear guidance system as in copending application Ser. No. 834,729, Flight Guidance System for Aircraft in Windshear, invented by Terry L. Zweifel and David A. Johnson and assigned to the assignee of the present invention. It will be clear to one skilled in the art that a similar circuit may be employed in place of level detector 99 of FIG. 6, so that both vertical and longitudinal windshear components may be detected while minimizing false alarms. In that event, counter 124 and timer 126 became redundant and may be deleted from the circuit of FIG. 9.

Figure 11:
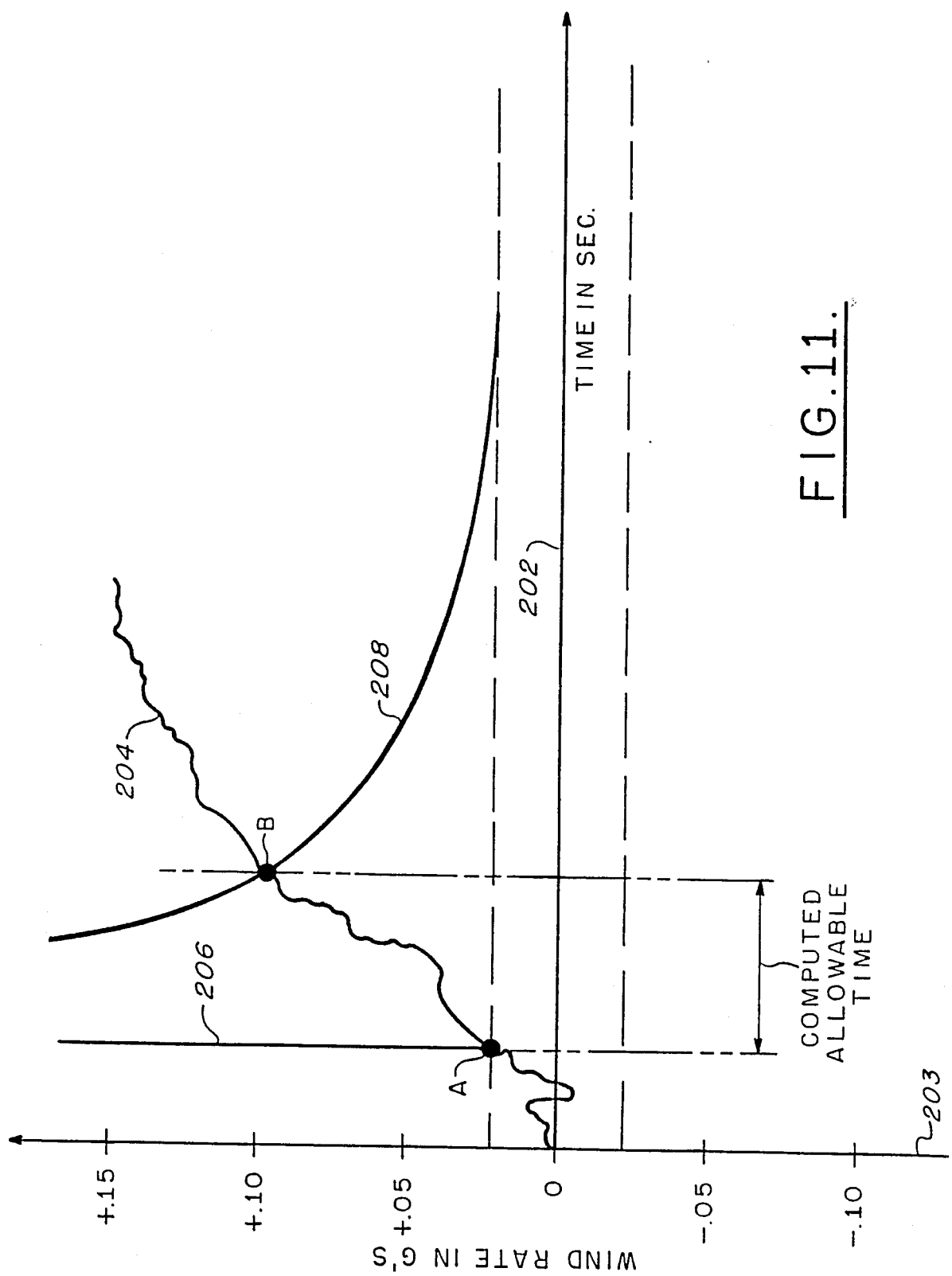
FIG. 11 is a timing diagram useful for understanding the operation of the circuit of FIG. 10.

FIG. 11 is illustrative of the operation of the level detector of FIG. 10, where the ordinate axis 203 is wind rate in gravitational units (g=32 ft/sec/sec) and the abscissa 202 is actual time in seconds. Assume at some point A the wind rate, line 204, exceeds the trip value of threshold detector 150. At this point timer 152 is activated, represented by the vertical line 206. As the wind rate continues to exceed the value of the threshold detector, the elapsed time from line 206 increases. When the elapsed time exceeds the computed allowable time on line 160 of FIG. 10, which is a function of the magnitude of the wind rate and is represented for example, by point B of FIG. 11, a logical 1 will appear at terminal A of FIG. 10, indicating the presence of a wind disturbance. Point B of FIG. 11 is one of a locus of points 208 of computed allowable time as appears on lead 160 of FIG. 10.

It will be appreciated from the foregoing that level detector 91 of FIG. 10 provides the following actions:

(1) The annunication of a windshear condition is dependent on both the magnitude and duration of the wind rate.

(2) For large wind rates, the allowable time before annunciation is fairly short; conversely, for small wind rates above the threshold level, annunication does not occur for a much longer time.

(3) Wind rates that are above the threshold level for elapsed times less than the computed allowable will not result (4) Very high magnitude wind rates that do not exist for long periods of time, such as can be caused by atmospheric turbulence, do not cause false annunciations since they do not exceed the computed allowable time.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for generating a windshear warning control signal, of the type having detector means for sensing the difference of aircraft inertial acceleration with respect to a supporting airmass, and providing vertical or longitudinal components thereof, comprising:

means responsive to said difference of inertial acceleration for providing a windshear rate signal representative of a magnitude of windshear rate exceeding a predetermined limit corresponding to a threshold of detection, means responsive to said windshear rate signal exceeding said predetermined limit for providing a first timing signal representative of a time duration of said rate signal, means responsive to said windshear rate signal for generating a second timing signal representative of a maximum allowable duration that safe flight can be sustained at said windshear rate, and means for combining said first timing signal and said second timing signal to obtain an algebraic difference thereof and generate said control signal when said first timing signal exceeds said second timing signal, so that said warning signal is generated after a time delay inversely as the magnitude of said windshear rate signal.

2. The apparatus as set forth in claim 1, further comprising:
means for providing a signal corresponding to a predetermined value of an aircraft parameter representative of a power-to-weight ratio, and
means for applying said aircraft parameter signal to said windshear rate signal for deriving said second timing signal.

3. The apparatus as set forth in claim 2, further comprising detection means responsive to the magnitude and polarity of said control signal for generating a windshear annunciation signal when said first timing signal has a value exceeding said second timing signal.

4. The apparatus as set forth in claim 3, wherein said means for generating a windshear annunciation signal further comprises:
means responsive to the magnitude of said windshear rate signal for providing a signal having a first logic condition when a predetermined value of said magnitude is exceeded, and a second logic condition when said predetermined value is not exceeded,
said first timing means is responsive to said logic signals and indicative of a time interval corresponding to a change in state between said second and first logic conditions, and
said means for generating said second timing signal comprises divider means having an output indicative of a time duration comprising the quotient of said aircraft parameter signal and said magnitude of windshear rate signal.

5. The apparatus as set forth in claim 4, wherein said windshear rate signal comprises vertical components of a total acceleration vector representative of the resultant sum of said vertical and horizontal inertial acceleration components of said aircraft.

6. The apparatus as set forth in claim 4, wherein said windshear rate signal comprises longitudinal components of said total acceleration vector.

7. The apparatus as set forth in claim 4, wherein said windshear rate signal comprises vertical and longitudinal components of said total acceleration vector.

8. A windshear detection circuit for providing a signal representative of the magnitude and duration of a windshear disturbance, of the type providing vertical and longitudinal rate components derived by processing air data acceleration signals corresponding to aircraft inertial acceleration and accelertion relative to a surrounding air mass comprising:
threshold detector means responsive to one of said rate components for providing an output signal when said one rate component exceeds a predetermined threshold,
timer means coupled to said threshold detector means to provide a signal indicative of a duration of said output signal,
means proportional to a power-to-weight ratio of said aircraft for providing a signal representative of an aircraft performance parameter,
divider means responsive to said rate component and said parameter signal for providing a quotient signal thereof,
means responsive to said quotient signal for providing a signal indicative of the absolute magnitude thereof,
means for combining said duration signal and said absolute magnitude signal for providing an algebraic difference thereof, and
means responsive to said algebraic difference for providing a signal indicative of the polarity thereof.

9. Windshear detection and warning apparatus for aircraft comprising:
means for providing a signal proportional to a total acceleration vector representative of an inertial acceleration of the aircraft with respect to ground independent of pitch or roll of the aircraft,
means for determining the rate and direction of rotation of said total acceleration vector,
means for determining the magnitude of said total acceleration vector,
means for providing a signal proportional to the product of said magnitude and said rate of rotation of said total acceleration vector, and
warning means responsive to values of said product signal in excess of a predetermined value.

10. Apparatus as set forth in claim 9 for determining the magnitude and rate of change of direction of said total acceleration vector of the aircraft wherein said total acceleration vector is comprised of horizontal and vertical vector components, further comprising:
first sensor means mounted rigidly to said aircraft with a sensing axis normal to a longitudinal axis of said aircraft to sense accelerations along said longitudinal axis,
second sensor means mounted rigidly to said aircraft in a plane normal to said longitudinal axis to sense accelerations normal to said longitudinal axis,
means for determining the pitch and bank attitude of the aircraft relative to an earth's gravity vector, and
data processor means responsive to said first and second sensors and said pitch and bank attitude determining means for generating signals proportional to the magnitude and direction of said total acceleration vector and to said horizontal and vertical components.

11. Windshear detection and warning apparatus as set forth in claim 10, further comprising:
means for providing a signal proportional to the rate of change of true forward speed of the aircraft in a supporting airmass,
means responsive to a horizontal acceleration vector component signal and said rate of change of true forward speed signal for providing a signal proportional to an algebraic difference thereof, and
means for providing said difference signal to said warning means for activating said warning means when said difference signal exceeds a predetermined value indicative of a horizontal windshear.

12. Windshear detection and warning apparatus as set forth in claim 11, further comprising:
means for providing a signal proportional to the rate of change of vertical airspeed of the aircraft relative to said supporting air mass,
means responsive to a vertical acceleration vector component and said rate of change of vertical airspeed signal for providing a signal proportional to an algebraic difference thereof, and means for providing said difference signal to said warning means for activating said warning means when said difference signal exceeds a further predetermined value indicative of a vertical windshear.

13. Apparatus as set forth in claim 12 for indicating a moderate windshear condition, comprising:
   means responsive to said rate of rotation of said total acceleration vector for providing a signal indicative of a downburst,
   means responsive to said signal proportional to an algebraic difference of said horizontal acceleration vector component and said rate of change of true forward speed for providing a signal indicative of a headwind windshear,
   means responsive to said signal proportional to an algebraic difference of said vertical acceleration vector and said rate of change of vertical airspeed signal for providing a signal indicative of an updraft,
   means for activating said warning means when at least one of said downburst signal, said headwind windshear signal, and said updraft signal exceeds a predetermined value for a predetermined time interval, and
   means for combining said predetermined value and said predetermined time interval to provide a signal indicative of a moderate windshear condition.

14. Apparatus as set forth in claim 12 for indicating a severe windshear comprising:
   means responsive to said rate of rotation of said total acceleration vector for providing a first signal indicative of a downburst,
   means responsive to said signal proportional to an algebraic difference of said horizontal acceleration vector component and said rate of change of true forward speed for providing a signal indicative of a tailwind windshear,
   means responsive to said signal proportional to an algebraic difference of said vertical acceleration vector and said rate of change of vertical airspeed for providing a second signal indicative of a downburst, and
   means for activating said warning means when at least one of said tailwind windshear signal and said first and second downburst signals exceeds a predetermined value for a predetermined time interval indicative of a severe windshear condition.

* * * * *